United States Patent [19]

Misawa

[11] Patent Number: 4,566,550
[45] Date of Patent: Jan. 28, 1986

[54] STAIR-CLIMBING WHEELCHAIR CARRIER

[75] Inventor: Rintaro Misawa, Tokorozawa, Japan

[73] Assignee: Sunwa Sharyo Manufacturing Co., Ltd., Tokyo, Japan

[21] Appl. No.: 606,801

[22] Filed: May 3, 1984

[30] Foreign Application Priority Data

Oct. 7, 1983 [JP] Japan .................................. 58-188112

[51] Int. Cl.$^4$ .............................................. B62B 5/02
[52] U.S. Cl. ..................................... 180/8.2; 16/18 B; 180/9.22; 180/907; 280/5.22; 280/242 WC; 280/DIG. 10; 297/DIG. 4
[58] Field of Search ....................... 180/9.22, 8.2, 907; 305/15, 60; 280/5.22, 242 WC, 289 WC, DIG. 10; 297/DIG. 4; 446/431; 16/18 B

[56] References Cited

U.S. PATENT DOCUMENTS 4,401,178 8/1983 Studer .................................. 180/8.2
4,432,426 2/1984 Misawa ....................... 280/289 WC

FOREIGN PATENT DOCUMENTS

302893 11/1932 Italy ..................................... 446/431
1546130 5/1979 United Kingdom ................. 180/8.2

Primary Examiner—Joseph F. Peters, Jr.
Assistant Examiner—Mitchell J. Hill
Attorney, Agent, or Firm—Martin A. Farber

[57] ABSTRACT

A stair-climbing wheelchair carrier has a frame body, a pair of rail frames formed in a lower portion of the frame body and a pair of endless belt crawlers engaged with the wheels provided on the frame body and with the rail frames. A travelling wheel mechanism is provided on each of the rail frames at a rear portion thereof. The travelling wheel mechanism comprises a lever rotatably mounted on the rail frame, a pair of travelling wheels provided on both ends of the lever, and a spring for maintaining said travelling wheels in a position parallel with the grounding surface of the crawlers. Both the travelling wheels are so disposed that contact points with the ground are at lower positions than the grounding surface of the crawlers.

3 Claims, 17 Drawing Figures

STAIR-CLIMBING WHEELCHAIR CARRIER

BACKGROUND OF THE INVENTION

The present invention relates to a stair-climbing wheelchair carrier on which a wheelchair with a disabled passenger seated therein is mounted, and particularly to a stair-climbing wheelchair carrier which moves smoothly on stairways as well as on flat floors.

There is provided a stair-climbing carrier on which a wheelchair is mounted for travelling on the stairway. For example, Japanese Patent Laid Open Publication No. 57-95267 discloses such a stair-climbing wheelchair carrier, in which a wheelchair is easily mounted on the carrier which is smoothly travels on the floor.

The stair-climbing wheelchair carrier has a pair of belt crawlers for easily descending or ascending stairs. However, the belt crawlers increases friction between the crawlers and the floor, which harms the operability of the carrier on the floor. In order to solve this problem, the crawler mechanism is provided with detachable wheels so that the carrier moves on the floor by the wheels. However, it is quite troublesome to attach and detach the wheels according to the travelling conditions.

SUMMARY OF THE INVENTION

The present invention is to overcome these inconveniences by the provision of an improved stair-climbing wheelchair carrier, providing wheel mechanisms for smooth travelling.

According to the present invention, there is provided a stair-climbing wheelchair carrier comprising:

a frame body;

a pair of rail frames formed in a lower portion of the frame body, wheels disposed on said frame body; a handle portion provided on the frame body, a wheelchair holding device provided on the handle portion for holding a wheelchair;

a pair of endless belt crawlers engaged with the wheels on the frame body and with the rail frames; a travelling wheel mechanism provided on each of the rail frames, the travelling wheel mechanism comprising a lever rotatably mounted on the rail frame, a pair of travelling wheels provided on both ends of the lever, and a spring for maintaining the travelling wheels in a position, the travelling wheels being so disposed that contact points with the ground are at lower positions than the grounding surface of the crawler.

The invention will now be described with reference to the following drawings of the preferred embodiments.

DETAILED DESCRIPTION OF PREFERRED EMBODIMENTS

Figure 1:
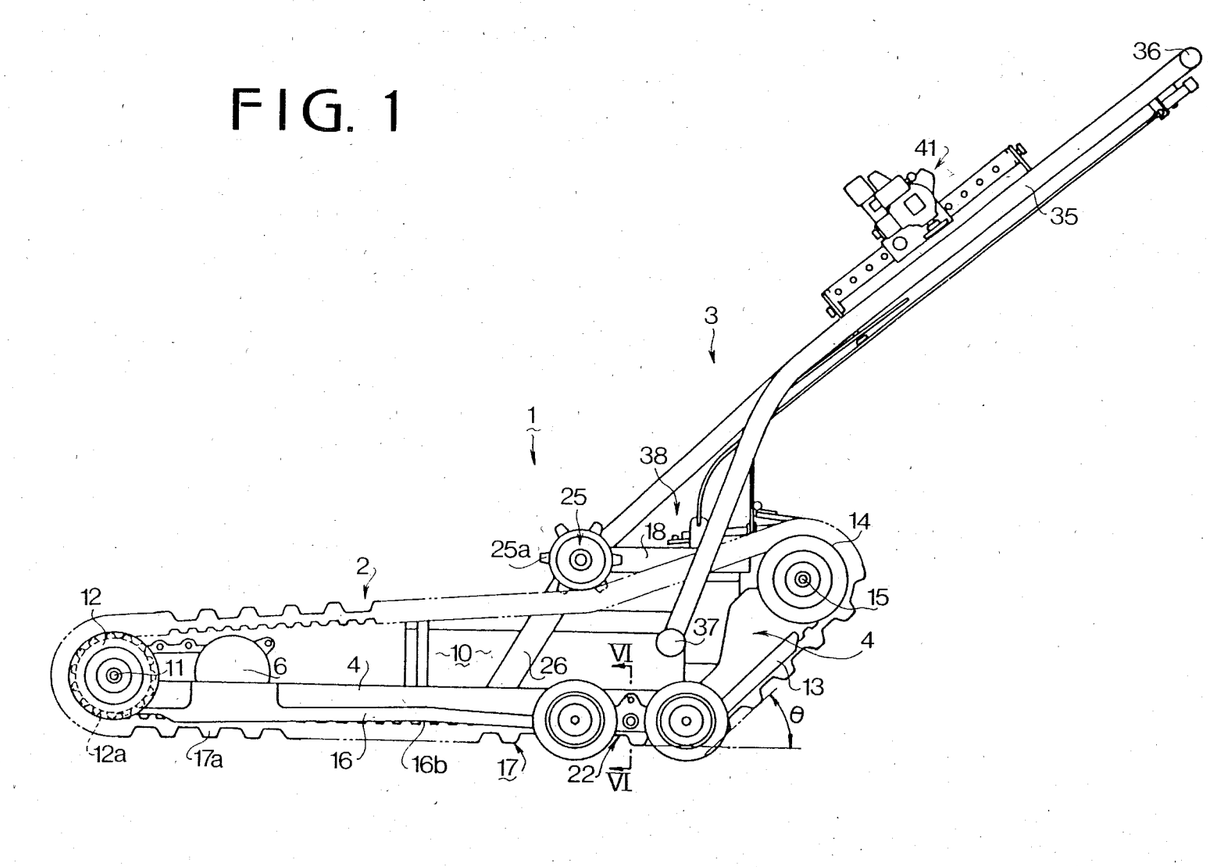
FIG. 1 is a side view showing a stair-climbing wheelchair carrier in accordance with one of the preferred embodiments of the present invention.

FIG. 1 is a side view generally showing a stair-climbing wheelchair carrier 1 which is comprised of a wheelchair carrier portion 2 and a handle portion 3.

Figure 2:
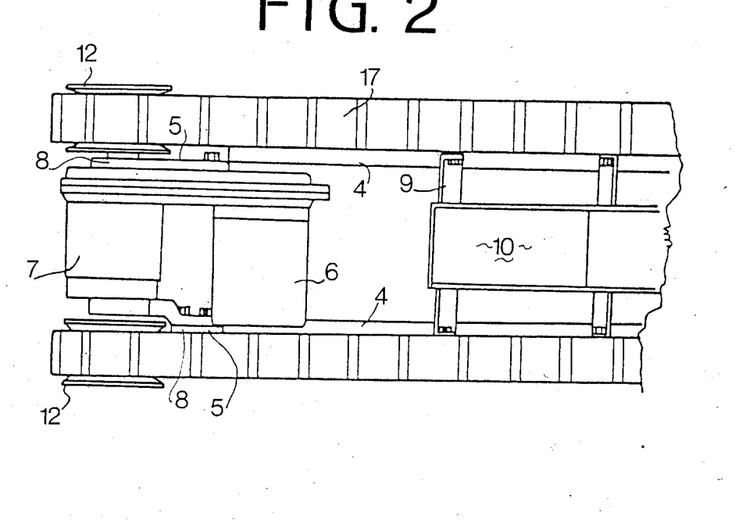
FIG. 2 is a plan view of the same.
Figure 3:
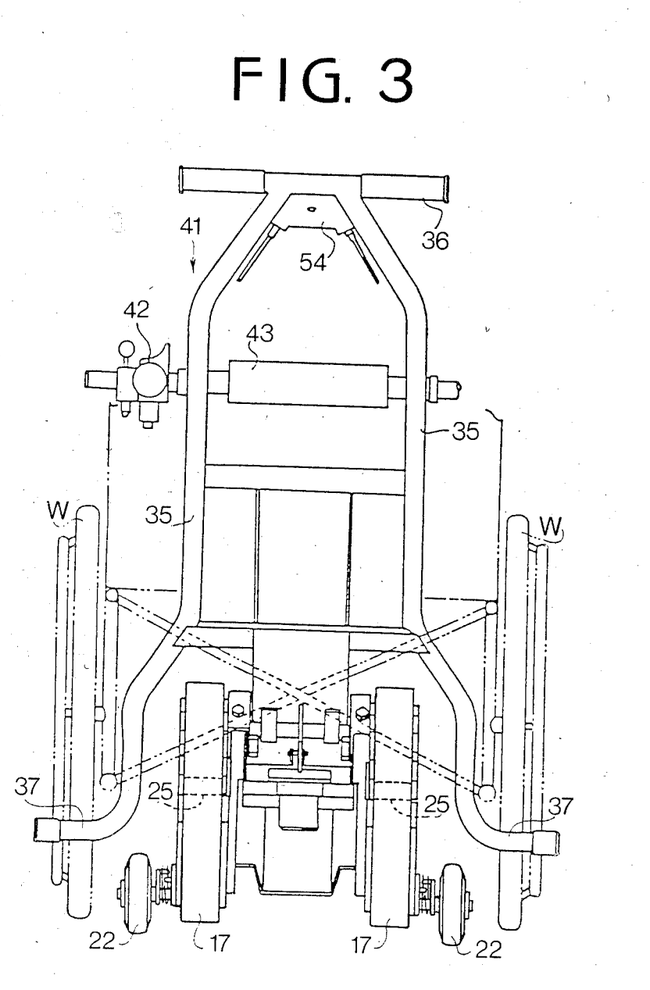
FIG. 3 is a rear view of the same.

As shown in FIGS. 1 and 2, the wheelchair carrier portion 2 has a pair of rail-frames 4 of aluminium die-casting, rear ends of which are curved upwards like a sleigh. These frames 4 are disposed parallel on each side of the carrier 2.

Flanges 5 formed on ends of the frames 4 are connected to each other through an attaching flange 8 of a reduction gear case which combines a driving motor 6 and a reduction gear 7. Connecting members 9 having L-shaped cross-section bridge over the frames 4 at an intermediate position of the length of the frame 4 to constitute the frame body of wheelchair carrier. A battery 10, a power source of the driving motor 6, is supported on the connecting members 9.

A pair of driving wheels 12 are secured to a driving shaft 11 connected to the reduction gear 7 and idlers 14 are mounted on shafts 15 provided on the rear or upper end of an overhang portion 13. Each idling wheel 14 is rotatably attached to each end of the idling shaft 15 provided at the upper end of an inclined guide portion 13. A belt crawler 17 engages with a guide groove of the wheel 12, a grounding guide portion 16, an underface guide groove of the overhang portion 13 and a guide groove of the idling wheel 14. A pair of the belt crawlers 17 are provided in parallel, the distance between which is smaller than the distance between a pair of wheels of the wheelchair.

Figure 4:
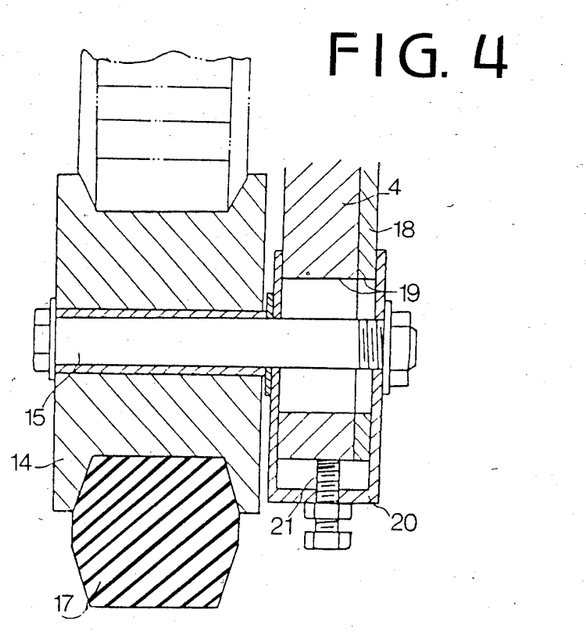
FIG. 4 is a cross-sectional view showing the suspension of idle wheels.

As shown in FIG. 4, the idling shaft 15 passes through slots 19 provided in the frame 4 and a side plate 18. A holding member 20 having a U-shaped cross section is slidably provided on the frame 4 and the side plate 18. The inner end of the shaft 15 is fixed to the holding member 20. Thus, the holding member 20 is moved along the slots 19 together with the shaft 15 by turning a screw 21. The screw 21 is fixed in a proper position to give a sufficient tension to the belt crawler 17.

Considering the road and staircase condition, the belt crawlers 17 are made of elastic, synthetic rubber to absorb shock as well as to protect the floor plate or staircase. On the outer surface of the belt crawler 17 is provided with lugs 17a disposed at a predetermined interval to properly engage with steps of the stair. On the inner surface of the belt crawler 17 there are provided lugs 17b engageable with driving teeth 12a of the driving wheel 12, preventing the belt crawler from slipping around the driving wheels 12. The belt crawler 17 has a span extending over two steps.

Figure 5:
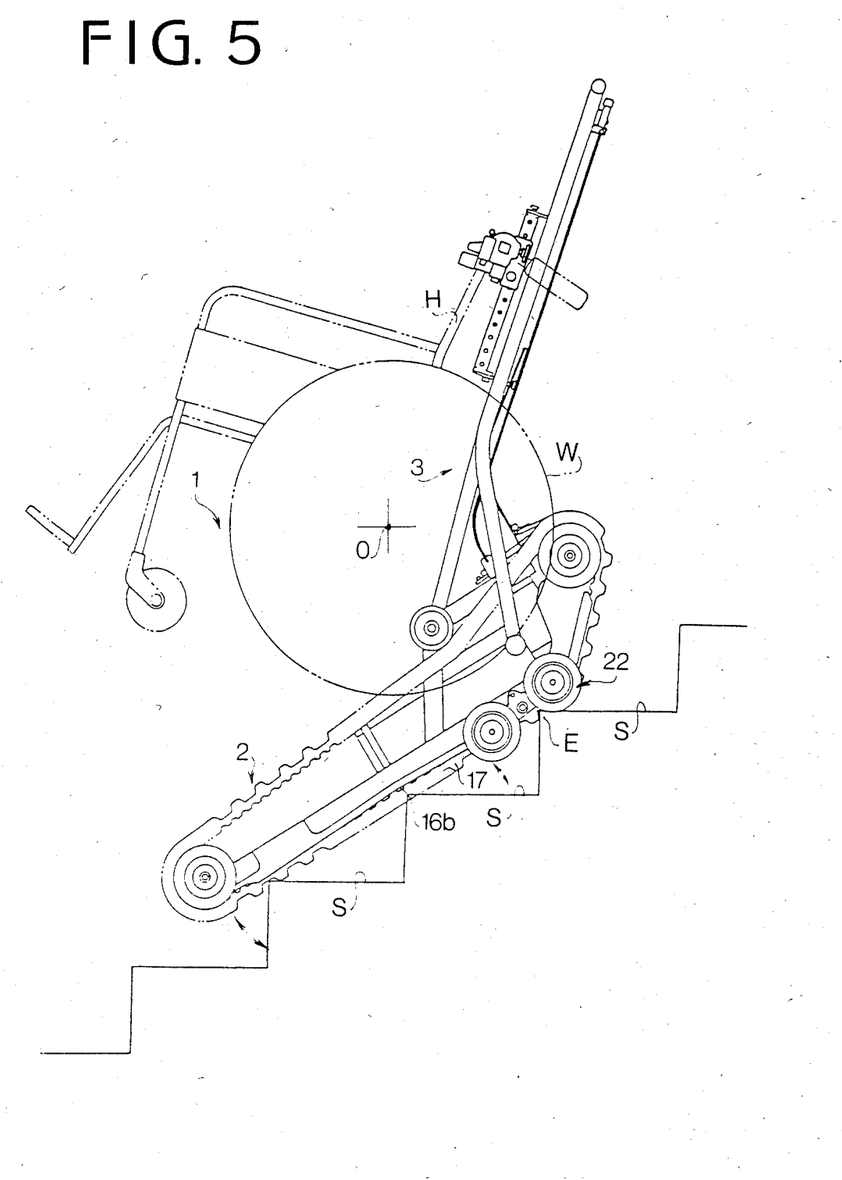
FIG. 5 is an explanatory view showing the stair-climbing operation of the carrier.

The grounding guide portion 16 of the rail frame 4 is bent upward slightly at the intermediate point to form a chevron-shaped recess 16b near the center of gravity of the total load weight with the wheelchair. Referring to FIG. 5, when the wheelchair carrier 2 starts to descend stairs, The carrier rotates gradually about the edge E owing to the recess 16b. Therefore, the operator can put the wheelchair carrier down on the stairs without fear.

Figures 6, 16:
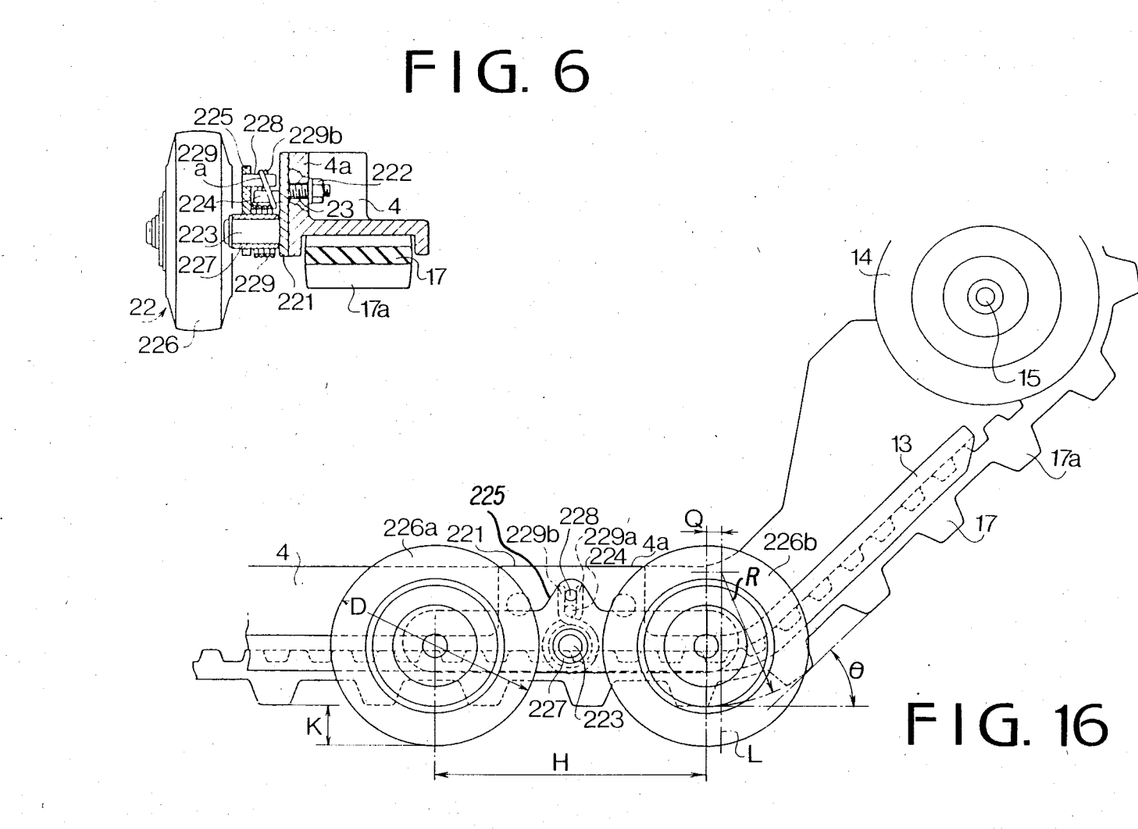
FIG. 6 is a cross sectional view showing the attachment of travelling wheels.
FIG. 16 shows a side view of a travelling wheel mechanism.

The frame 4 has a pair of rims 4a (FIG. 6) at opposite sides of a rear portion of the carrier for attaching travelling wheel mechanisms 22. As shown in FIGS. 6 and 16, each travelling wheel mechanism 22 comprises a base plate 221 secured to the rim 4a by a pair of bolts 222 which are engaged with holes 23 and a lever 225 both ends of which are provided with travelling wheels 226a and 226b through shafts respectively. The lever 225 is rotatably mounted on a shaft 223 through a bearing 227 at a central portion. The shaft 223 is secured to the base plate 221. The lever 225 has a pin 228 provided on an upper portion of the shaft 223, projecting toward the base plate 221. A pin 224 is provided on the base plate 221 at an upper portion of the bearing 227 so as to project between the shaft 223 and pin 228. A return spring 229 is wound on the outer periphery of the bearing 227 in a space between the base plate 221 and lever 225. Both ends 229a and 229b of the spring 229 are engaged with the pins 224 and 228 at the opposite sides thereof respectively so that the lever 225 having the wheels 226a and 226b is kept parallel to the ground surface of the crawler 17. In other words, the line connecting centers of both wheels 226a and 226b is positioned in parallel with the grounding surface of the crawler, and contact points of both travelling wheels are positioned lower than the grounding surface of the crawler.

In this embodiment, each travelling wheel has an outer diameter D of 100 mm and a span H between the wheels is 130 mm. When wheels 226a and 226b are on a plane, a grounding surface level K of the crawler 17 is 20 mm and an angle $\theta$ defined by the inclined guide portion 13 and the plane is 45°. The outer periphery of the inclined guide portion 13 and guide portion 16 forms an arc of circle with a radius R (see FIG. 16) at an interconnection thereof. The center of the arc of the circle is positioned on a vertical line L positioned displaced from the vertical center line of the wheel 226b by Q (Q=5 mm) to have a predetermined radius of curvature. Accordingly, the travelling wheel mechanism is adapted to any type of steps.

Figure 8:
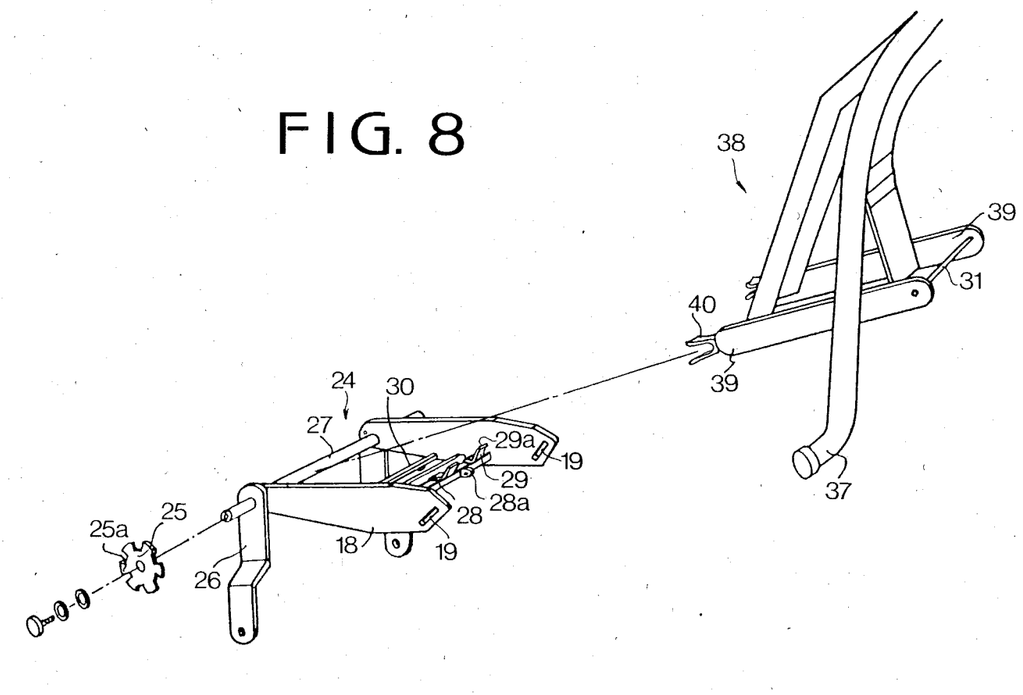
FIG. 8 is a perspective view showing an attaching device.
Figure 9:
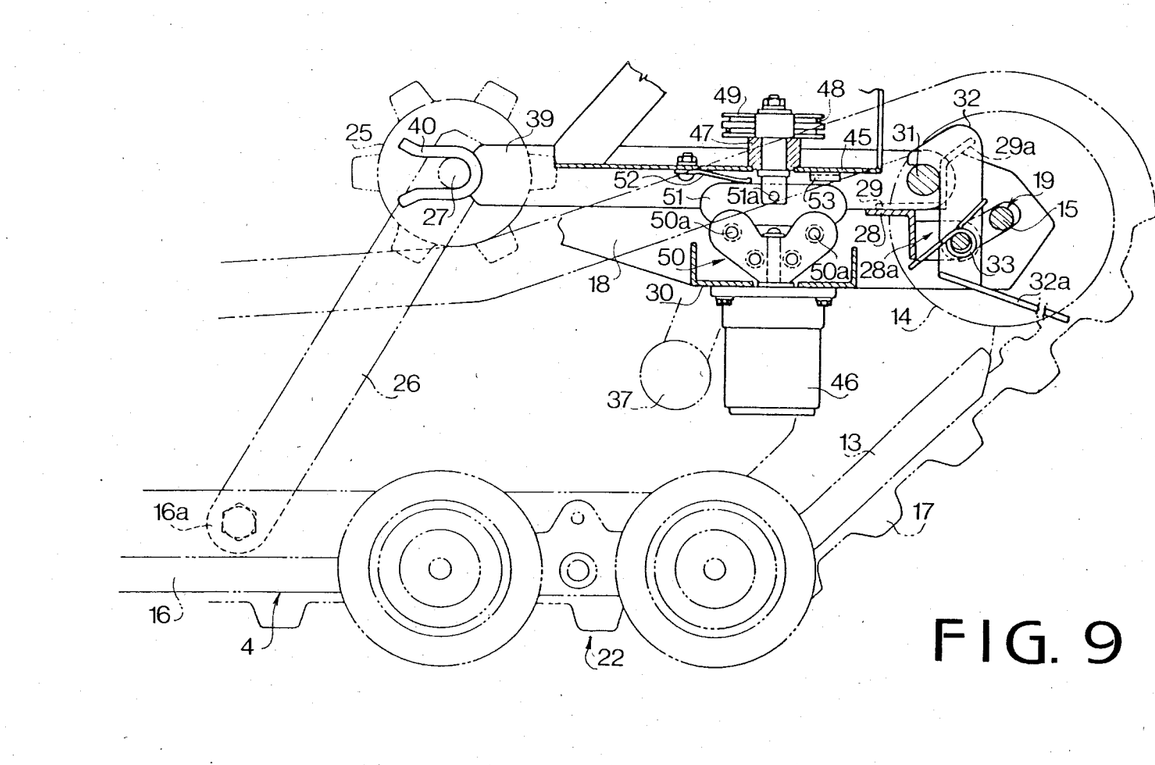
FIG. 9 is a side view showing the vicinity of the attaching device.

Referring to FIGS. 8 and 9, an attaching device 24 is provided in a rear portion of the wheelchair carrier 2 for attaching the handle portion 3. The attaching device 24 comprises a pair of side plates 18, legs 26 secured to ends of the side plates 18, a shaft 27 secured to the side plates 18, idlers 25 rotatably mounted on opposite ends of the shaft 27, and a supporting plate 28 having an L-shaped cross section secured to the side plates 18 and a supporting plate 30 of channel steel secured to the side plates 18 for supporting a switch box. Each leg 26 is secured to the guide portion 16 at a lug 16a. Each idler 25 has teeth 25a which engages with lugs 17a of the belt crawler 17, so that the upper moving portion of the belt crawler is deflected to a substantially horizontal plane.

A pair of engaging members 29 each of which has a rising portion 29a are secured to the upper portion of the supporting plate 28. A hook 32 is pivotally supported on a lug 28a secured to the center of the supporting plate 28. The hook 32 is urged in the counter clockwise direction by a spring 33 to engage with an engaging shaft 31. The hook 32 is rotated in the clockwise direction by depressing a pedal 32a by a person's foot.

Figure 10:
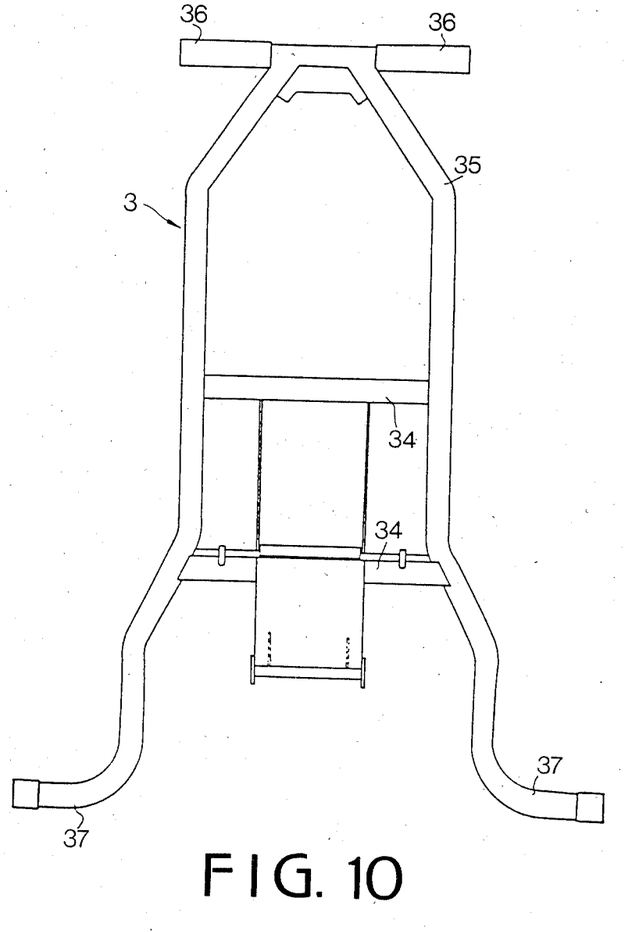
FIG. 10 is a rear view of a holding handle.
Figure 11:
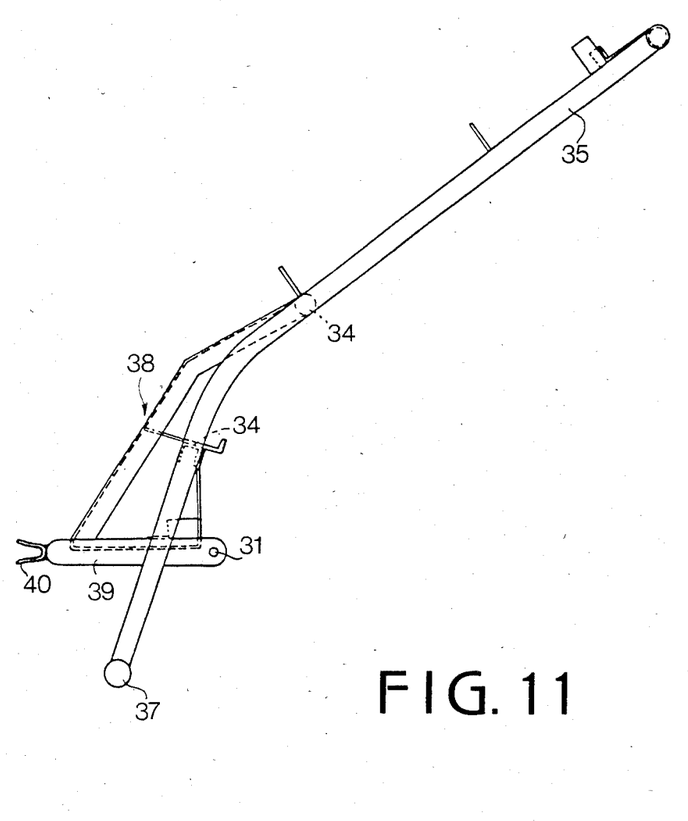
FIG. 11 is a side view of the same.

Referring to FIGS. 10 and 11, the handle portion 3 comprises a frame 35 having reinforcement members 34, a pair of grips 36, and a pair of wheel holding portions 37.

An engaging device 38 is secured to the reinforcement members 34. The engaging device 38 comprises a pair of receiving plates 39, the engaging shaft 31 secured to the plates 39, and a pair of U-shaped receiving members 40 secured to ends of the plates 39.

As shown in FIG. 9, the receiving members 40 engage with the shaft 27 and the engaging shaft 31 engages with the hook 32 and with the rising portion 29a, and the plates 39 are put on the supporting plate 28. Thus, the handle is attached to the attaching device 24.

Figure 12:
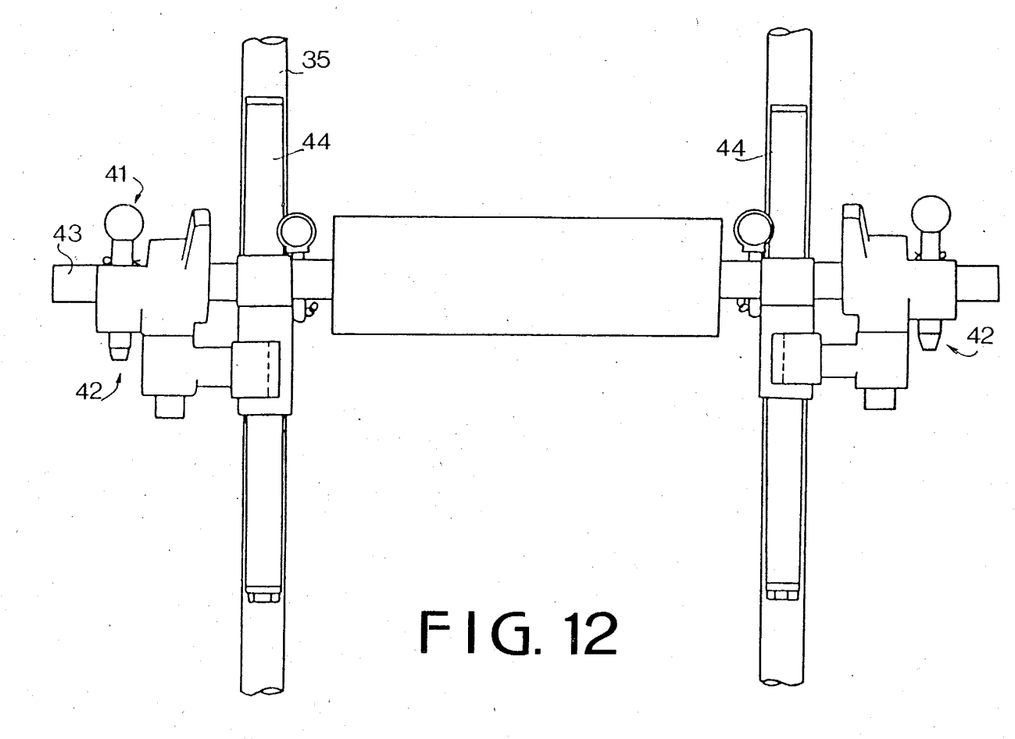
FIG. 12 is a plan view showing the holding device.

FIG. 12 shows a wheelchair holding device 41 provided on the frame 35 of the handle 3. The wheelchair holding device 41 comprises a pair of engaging devices 42 for engaging with a handle H of the wheelchair, a back bar 43 for supporting the engaging devices 42, and a pair of guide bars 44 secured to the frame 35 for supporting the back bar 43. The back bar 43 is adapted to be moved along the guide bars 44 and secured thereto at a desired position.

As shown in FIG. 9, an operating device is provided on a base plate 45 secured between plates 39 for operating a switch box 46 for the motor 6. The operating device comprises a rotary shaft 47 rotatably supported on the base plate 45, a pulley 49 secured to the shaft 47, a cable 48 engaged with the pulley 49, and an actuating plate 51 pivoted to the lower end of the shaft 47 by a pin 51a.

The actuating plate 51 engages between a pair of butterfly handles 50 which are connected by pins 50a with each other and secured to the switch box 46. The actuating plate 51 is urged counter clockwise by a spring 52 to engage with the pin 50a. Thus, the rotation of actuating plate 51 may be transmitted to the handles 50. The shaft of the switch box 46 is automatically returned to the O-position when the motor is stopped. On the other hand, a pair of stoppers 53 are provided on the underside of the base plate 45 at a position corresponding to the zero position. Therefore, if the plate 51 is removed from the handles 50, the actuating plate 51 is rotated by the spring 52, so that the other end of the plate 51 engages with the stoppers 53.

Figure 13:
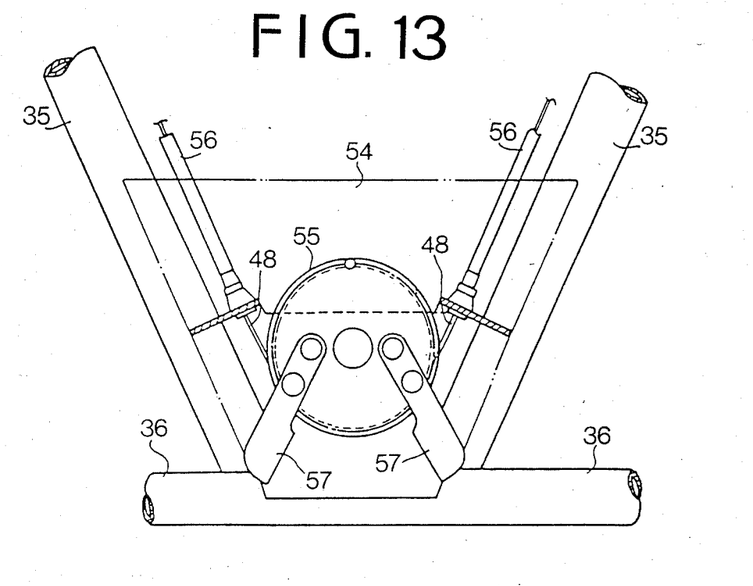
FIG. 13 is a plan view of a driving pulley portion.
Figure 14:
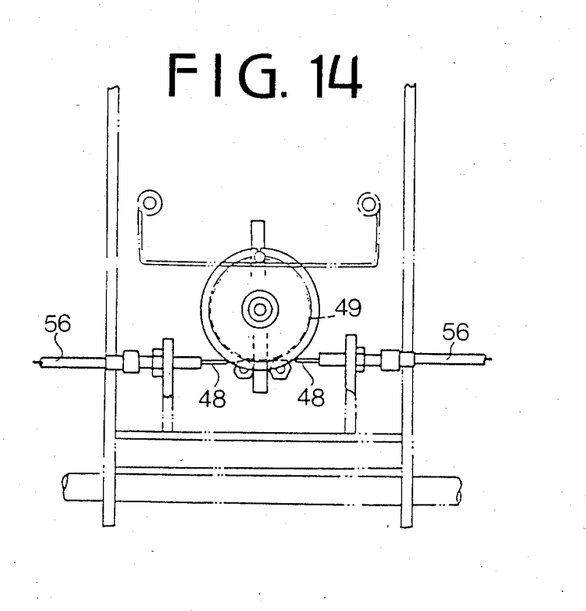
FIG. 14 is a plan view of a driven pulley portion.

Referring to FIGS. 13 and 14, the cable 48 is wound on pulley 49 and pulley 55 provided on a support 54 about one turn respectively. The cable 48 is slidably engaged in guide pipes 56. A pair of handles 57 are secured to the pulley 55 positioned near grips 36.

Figure 15:
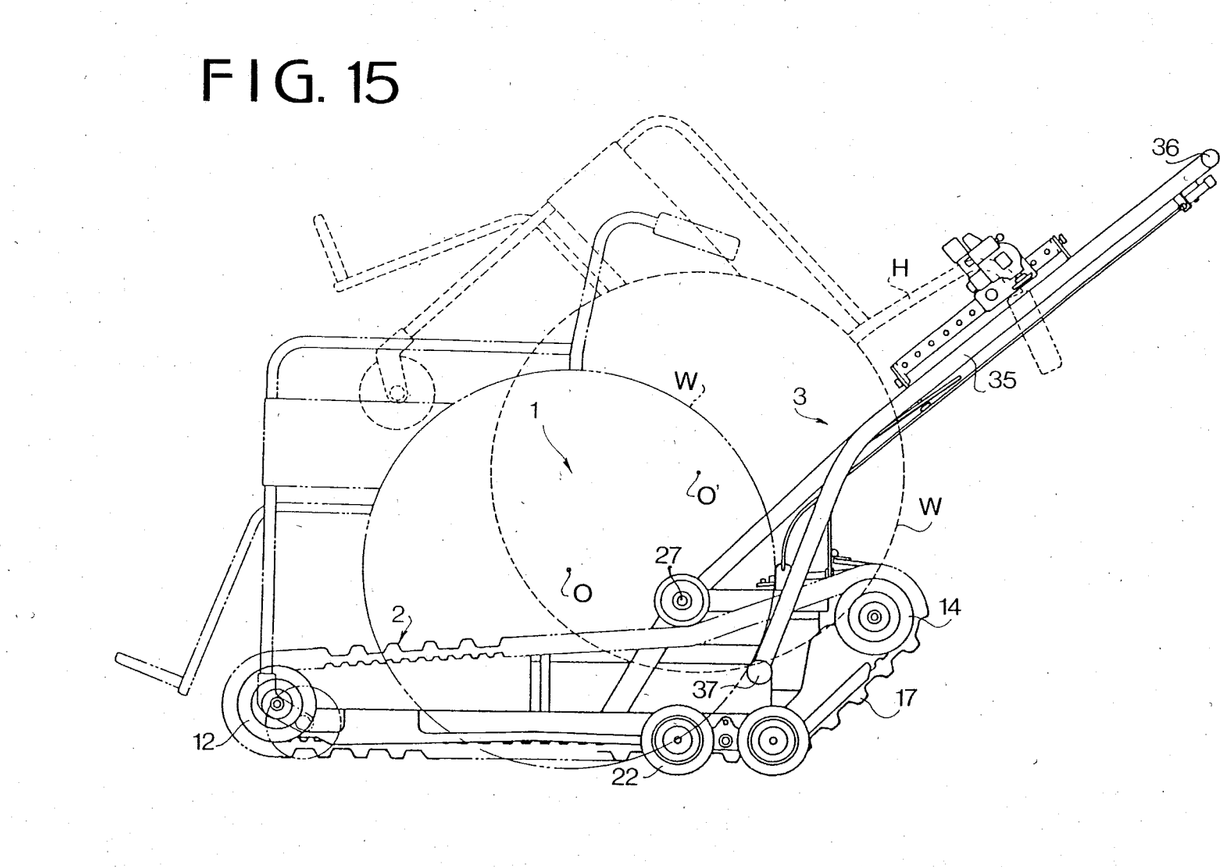
FIG. 15 is an explanatory of the attachment of the wheelchair.

To mount the wheelchair on the carrier 1, first the pedal 32a is depressed by the foot to release the hook 32 from the engaging shaft 31. Then the grips 36 of the handle portion 3 are rotated about the shaft 27 to the raised position as shown in FIG. 15. In such a position, wheelchair is moved on the carrier until the wheels W abut on holding portion 37, and then the handle H of the wheelchair is engaged with the engaging devices 42.

Thereafter, the handle portion 3 is rotated in the clockwise direction to the initial position so that the bar 31 is engaged with the hook 32. Thus, the wheelchair is held in position for ascending or descending the stairs. Since the shaft 27 of the rotation of the handle 3 is positioned near the shaft O of the wheel W, the operation for rotating the handle 3 may be easily accomplished with a small force. At that time, the plate 51 rotates about the pin 51a so that the end of the plate engages between the stoppers 53. The plate 51 engages with a pin 50a. The wheelchair carrier 1 ascends or descends the stairs by the motor 6 by operating the swich box 46 through the handles 57.

Figure 17:
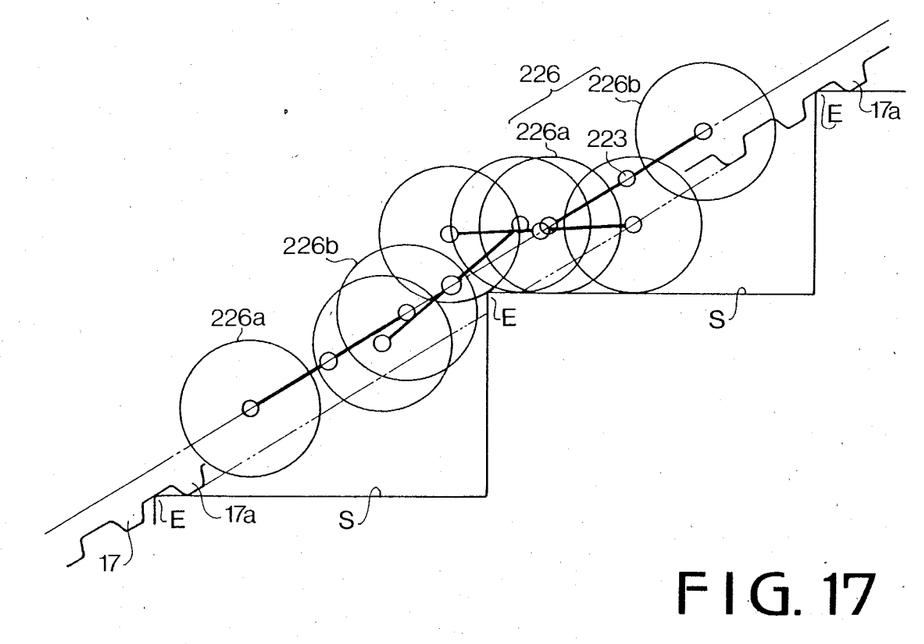
FIG. 17 is a schematic view showing operation of the travelling wheels.

FIG. 17 shows the operation of the travelling wheels on steps. In descending stairs, when the front wheel 226a touches the edge E of the step S, the rear wheel 226b is urged to engage with the step against the spring 229. When the rear wheel 226b engages with the step, the lever 225 becomes horizontal, so that the wheel 226a passes the step without turning on the edge E. At that time, the front wheel 226a is at a higher position than the crawler 17. Then, the lever 225 rotates in the counter-clockwise direction about the shaft 223 by the spring 229. The rear wheel 226b also passes the step without turning on the edge E. Travelling wheels 226a and 226b are positioned in the spaces between the steps to remain parallel with the crawler 17 without engaging with the steps. Thus, the lug 17a of the crawler 17 is securely engaged with the edge E. In ascending stairs, the operation is reversed. The crawler 17 is upwardly inclined at the inclined guide portion 13, so that the carrier can smoothly move from stairs to a landing.

Figure 7:
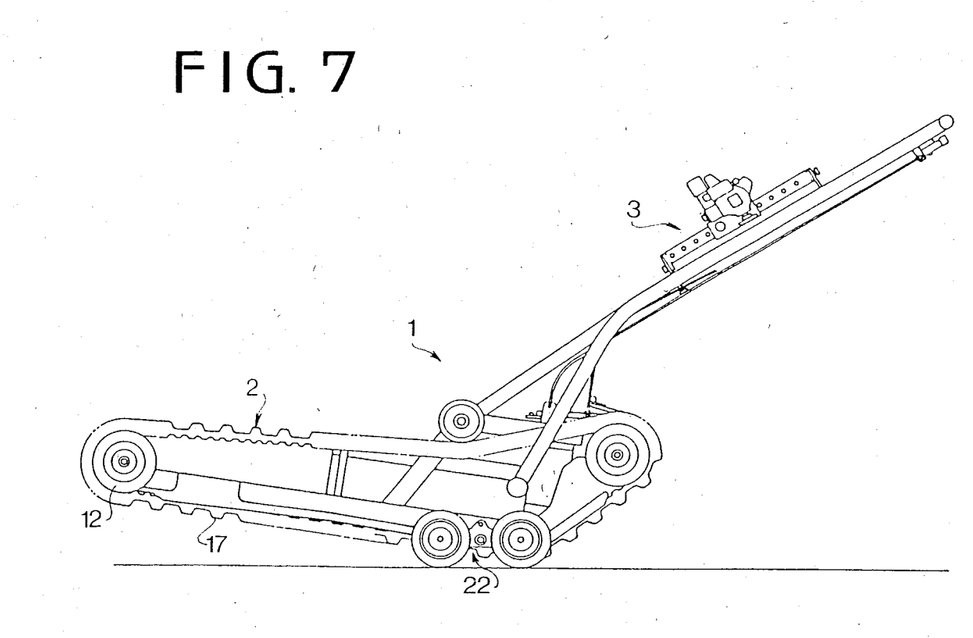
FIG. 7 is a explanatory view showing the usage of the travelling wheels.

When travelling on a plane such as corridors, the handles 3 are depressed to raise the driving wheels 12. Only travelling wheels 226a, 226b roll on the floor as shown in FIG. 7. Thus, the carrier can be easily moved by the operator or attendant.

To remove the wheelchair from the carrier, the motor 6 is stopped by operating the handles 57, so that the actuating plate 51 is returned to the zero position. The wheelchair is removed in the reverse order to the above described manner for mounting the wheelchair.

In order to store, the wheelchair carrier 1 in a small space, the handle portion 3 may be removed from the carrier portion 2. In such a condition, the carrier portion 2 may be moved by directly operating the handles 50.

What is claimed is:

1. A stair-climbing wheelchair carrier comprising:
a frame body;
a pair of rail frames formed in a lower portion of said frame body, rear ends of said rail frames having sleigh-like upward portions;
wheels disposed on said frame body;
a handle portion provided on said frame body;
a wheelchair holding device provided on said handle portion for holding a wheelchair;
a pair of endless belt crawlers engaged with said wheels on said frame body and with said rail frames;
said endless belt crawlers having a predetermined span extending two steps of a stairway and an oblique overhang portion at one end of said frame body which has predetermined height higher than the usual height of a step of the stairway;
a travelling wheel mechanism provided on each of said rail frames, said travelling wheel mechanism comprising a lever rotatably mounted on said rail frame, a pair of travelling wheels provided on both ends of said lever, and a spring for maintaining said travelling wheels in a position, the travelling wheels being so disposed that contact points thereof with the ground are at lower positions than a grounding surface of said crawlers.

2. The stair-climbing wheelchair carrier according to claim 1 wherein the line connecting centers of said travelling wheels is in parallel with said grounding surface of said crawlers.

3. The stair-climbing wheelchair carrier according to claim 1 wherein said travelling wheel mechanism is positioned at a rear position of said rail frame.

* * * * *